United States Patent
Ahn et al.

(10) Patent No.: US 11,120,701 B2
(45) Date of Patent: *Sep. 14, 2021

(54) ADAPTIVE PRESENTATION OF EDUCATIONAL CONTENT VIA TEMPLATES

(71) Applicant: INTERNATIONAL BUSINESS MACHINES CORPORATION, Armonk, NY (US)

(72) Inventors: Jae-Wook Ahn, Nanuet, NY (US); Maria D. Chang, Irvington, NY (US); Sharad Sundararajan, Yorktown Heights, NY (US); Ravi Tejwani, Cambridge, MA (US); Patrick D. Watson, Montrose, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,491

(22) Filed: Feb. 26, 2020

(65) Prior Publication Data
US 2020/0193853 A1    Jun. 18, 2020

Related U.S. Application Data

(63) Continuation of application No. 15/591,628, filed on May 10, 2017, now Pat. No. 10,629,089.

(51) Int. Cl.
*G09B 5/12* (2006.01)
*G09B 5/06* (2006.01)
*G09B 7/02* (2006.01)

(52) U.S. Cl.
CPC ............. *G09B 5/12* (2013.01); *G09B 5/06* (2013.01); *G09B 7/02* (2013.01)

(58) Field of Classification Search
CPC ............. G09B 5/06; G09B 5/12; G09B 7/02
See application file for complete search history.

(56) References Cited

U.S. PATENT DOCUMENTS

| | | |
|---|---|---|
| 6,201,948 B1 | 3/2001 | Cook et al. |
| 7,542,932 B2 | 6/2009 | Chalermkraivuth et al. |
| 8,239,294 B2 | 8/2012 | Agrawal et al. |
| 2003/0049593 A1 | 3/2003 | Parmer et al. |
| 2004/0161734 A1 | 8/2004 | Knutson |
| 2006/0024654 A1 | 2/2006 | Goodkovsky |

(Continued)

OTHER PUBLICATIONS

List of IBM Patents or Patent Applications Treated as Related (2 pgs).

(Continued)

*Primary Examiner* — Eddy Saint-Vil
(74) *Attorney, Agent, or Firm* — Intelletek Law Group, PLLC; Gabriel Daniel, Esq.

(57) ABSTRACT

A method and system of providing education content to a student is provided. A topic to be taught to a student is received. A user model of the student is identified. An electronic content model for the topic is determined. One or more presentation templates are identified based on the electronic content model. A concept map is determined based on the one or more presentation templates. A presentation template is selected from the one or more presentation templates. A segment of an educational content of the topic is provided to a user device of the student, based on the selected presentation template.

18 Claims, 5 Drawing Sheets

(56) References Cited

U.S. PATENT DOCUMENTS

| | | |
|---|---|---|
| 2007/0112703 A1 | 5/2007 | Gu et al. |
| 2008/0102428 A1 | 5/2008 | Levy et al. |
| 2011/0039249 A1 | 2/2011 | Packard et al. |
| 2011/0065082 A1 | 3/2011 | Gal et al. |
| 2011/0123967 A1 | 5/2011 | Perronnin et al. |
| 2012/0052476 A1 | 3/2012 | Graesser et al. |
| 2012/0296853 A1 | 11/2012 | Galloway et al. |
| 2013/0011821 A1 | 1/2013 | Denley |
| 2014/0236756 A1 | 8/2014 | Bourke et al. |
| 2014/0272912 A1 | 9/2014 | Rozycki et al. |
| 2015/0081611 A1 | 3/2015 | Shivakumar |
| 2015/0206442 A1 | 7/2015 | Brown |
| 2016/0035237 A1 | 2/2016 | Nealon et al. |
| 2016/0127010 A1 | 5/2016 | Rho et al. |
| 2018/0232352 A1 | 8/2018 | Fulford et al. |
| 2018/0268727 A1 | 9/2018 | Dohring et al. |

OTHER PUBLICATIONS

Rafferty, et al., "Faster Teaching via POMDP Planning", Cognitive Science (2015), pp. 1-43.

ADAPTIVE PRESENTATION OF EDUCATIONAL CONTENT VIA TEMPLATES

BACKGROUND

Technical Field

The present disclosure generally relates to learning systems, and more particularly, to interactive and intelligent learning systems that are adaptive to a student.

Description of the Related Art

Traditionally, an educator (e.g., a teacher, a parent or a coach; hereinafter "a teacher") is physically present with a student so that the teacher can assess a performance thereof. However, as technology progresses, an increasing portion of education takes place in a computerized environment or scenario, where a teacher may not be individually interacting with a student. In some cases, a teacher may not even be a human being, and a student may be learning through or from a machine having a level of intelligence, such as an electronic learning console or a computer. Such systems, sometimes referred to as intelligent tutoring systems (ITS), can interact with a student to teach various subject matters.

SUMMARY

According to various embodiments, a computing device, a non-transitory computer readable storage medium, and a method are provided. A user model of the student is identified. A content model for the topic is determined. One or more presentation templates are identified based on the content model. A concept map is determined based on the one or more presentation templates. A presentation template is selected from the one or more presentation templates. A segment of an educational content of the topic is provided to a user device of the student, based on the selected presentation template.

In one embodiment, upon determining that a presentation of the segment of the educational content of the selected presentation template can be augmented, augmenting an interchangeable element of the segment of the educational content based on the user model of the student.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to computerized aiding of a student. Education content is provided to a student in a way that is sensitive to the profile of the student. A topic to be taught to the student is received. A user model of the student is identified. A content model for the topic is determined. One or more presentation templates are identified based on the content model. A concept map is determined based on the one or more presentation templates. A presentation template is selected from the one or more presentation templates. A segment of an educational content of the topic is provided to a user device of the student, based on the selected presentation template. Reference now is made in detail to the examples illustrated in the accompanying drawings and discussed below.

Example Architecture

Figure 1:
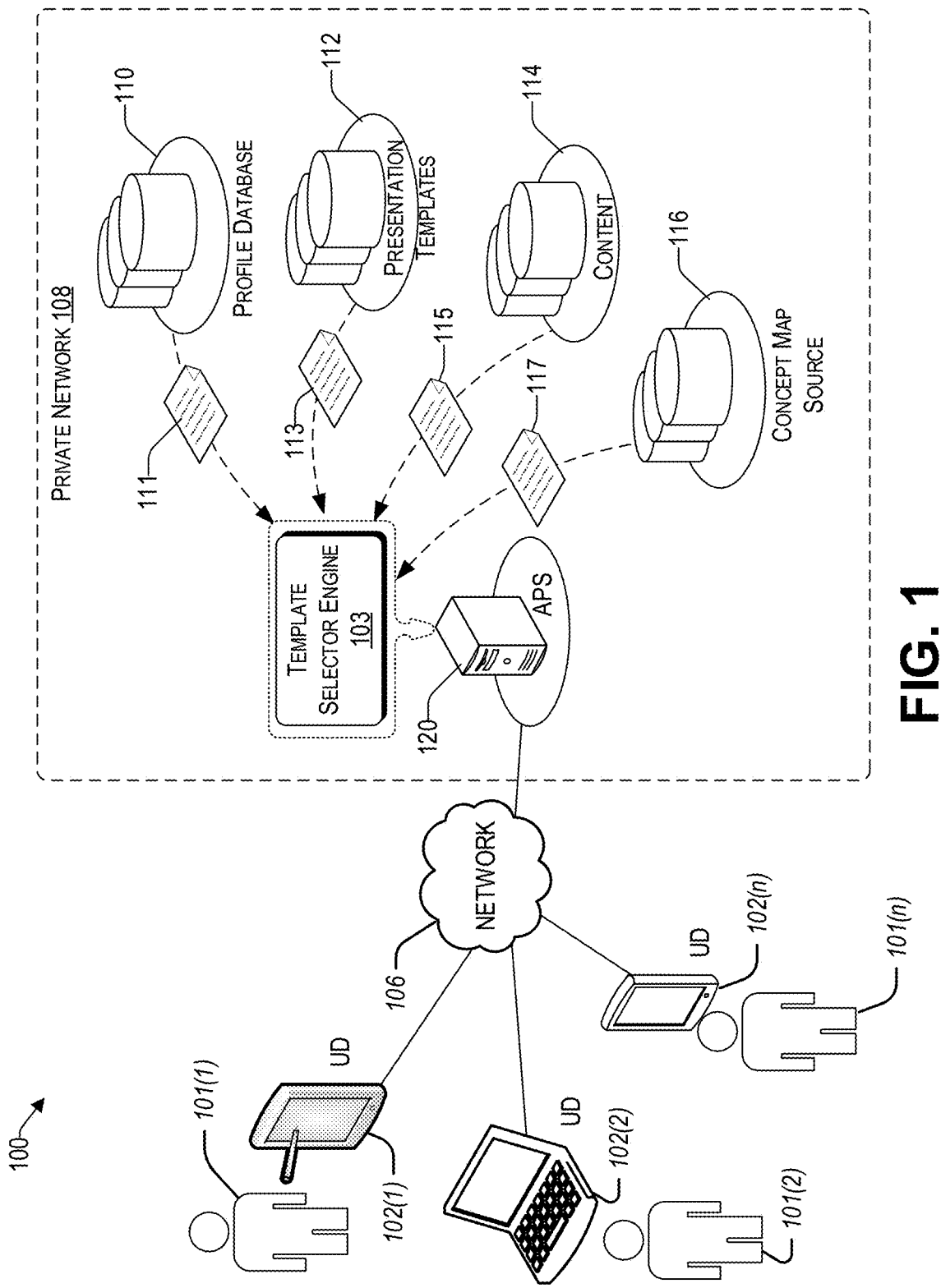
FIG. 1 illustrates an example architecture for implementing an interactive learning system that provides an individualized teaching approach based on presentation templates.

FIG. 1 illustrates an example architecture 100 for implementing an interactive learning system that provides individualized teaching based on presentation templates. Architecture 100 includes a network 106 that allows various user devices 102(1) to 102(*n*) to communicate with each other, as well as any other components that are connected to the network 106, such as an Adaptive Presentation Server (APS) 120, a student profile database 110, a presentation template database 112, a content database 114, and a concept map source 116.

The network 106 may be, without limitation, a local area network ("LAN"), a virtual private network ("VPN"), a cellular network, the Internet, or a combination thereof. For example, the network 106 may include a mobile network that is communicatively coupled to a private network that provides various ancillary services, such as communication with various application stores, libraries, and the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users.

The network 106 allows a template selector engine 103 running on the APS 120 to communicate with one or more users 101(1) to 101(*n*), referred to herein as students, over their user devices (UD's) 102(1) to 102(*n*), respectively, to provide an interactive and adaptive presentation of educational content to each student 101(1) to 101(*n*), independently.

For purposes of later discussion, several user devices appear in the drawing, to represent some examples of the devices that may receive various services via the network 106. Today, user devices typically take the form of portable handsets, smart-phones, tablet computers, personal digital assistants (PDAs), virtual reality (VR) devices, augmented reality (AR) devices and smart watches, although they may be implemented in other form factors, including consumer, and business electronic devices.

A user device (e.g., 102(1)) may have various applications stored in its memory and may supplement these applications, including a learning application (app), discussed in more detail later. The learning app may interact with the template selector engine 103 of the APS 120 over the network 106 to receive educational content based on a template that is suitable to the student, accordingly. The learning app may also determine the hardware and software capability of the user device. The learning app can then interact with the template selector engine 103 to provide this information, which is used as an input parameter for the template selector engine 103 to determine the appropriate template for teaching a topic to the student. Still further, a student (e.g., 101(1)) can use their user device (e.g., 102(1)) to provide feedback to the template selector engine 103 as to the effectiveness of the present template, such that the template selector engine 103 can dynamically adjust the template between different segments of the educational content. Accordingly, a user device (e.g., 102(1)) facilitates an interactive environment between the template selector engine 103 and the student (e.g., 101(1)).

The network 106 is supported by a private network 108 that provides ancillary services to the APS 120. In one embodiment, there is a profile database 110 that has information that helps create a user model for a student. Such information may include a student's past performance for various subject matters. Example indicia of performance include grades, test scores, teacher input, class standing, whether there is an individual education program (IEP), etc. The profile database 110 may also include the interests, strengths, and weakness of the student. Areas of interest may include hobbies, pets, and the like. Strengths may include achievements (e.g., trophies) in both academic and non-academic fields, languages spoken, places traveled, recommendations, etc. To provide a more complete profile, weaknesses are identified as well, such as fear of flying, below average English skills, fear of mathematics, a handicap, suffering from post-traumatic stress disorder (PTSD), etc. All the indicia stored in the profile database 110 collectively provides a user model 111 of the student, which is used as one of the factors to select an appropriate presentation template that better accommodates teaching a topic to a student. In various embodiments, the indicia stored in the profile database 110 may be provided by the student, a parent, an authorized educator (e.g., a human), or an administrator involved with the education of a student.

The template selector engine 103 of the APS 120 can refer the profile database 110 to retrieve a user model 111 for a student (e.g., 101(1)) therefrom to determine an academic proficiency of the student with respect to the topic being taught, as well as the indicia discussed herein, to identify a presentation template for the topic being taught. The goal is to identify a presentation template that is most likely to be effective to teach the topic to the student (e.g., 101(1)) via their respective user device (e.g., (102)).

In one embodiment, there is a presentation template database 112 that is operative to provide various presentation templates 113 that are available for a content model of the topic. Presentation templates 113 embody one or more explanation strategies, an interactive remediation tactic, and/or modality of teaching. Thus, the presentation templates 113 include different approaches of teaching a topic. For example, a topic may be presented in the form of an interactive discussion. An intelligent teaching system (ITS) of the APS provides questions and receives responses from a student. Such interaction guides the student to achieve a desired knowledge level of the topic being taught. The discussion method provides an opportunity to monitor a student's learning. For example, the answers provided may reveal the extent and quality of the learning taking place.

A topic may be taught in the form of a lecture, which may be provided as an audio-visual presentation (e.g., a video). Such method of instruction may be appropriate for students who have a limited knowledge with respect to a topic being taught.

A topic may be taught based on demonstration, where a desired skill is taught via presentation on the user device of a student and rehearsal by the student. In some scenarios, a "compare-and-contrast" approach may be effective. Such approach may be particularly useful when a student has expertise in one subject matter but not in the topic being taught. Bay way of comparison, the subject matter of expertise may be leveraged to teach the new topic.

A topic may be taught based on a personalized analogy, which may have similarities to the compare-and-contrast approach discussed above. For example, upon identifying the personal situation of a student from the user model 111, a concept can be explained with reference to a student's personal experience. For example, some medical symptoms can be explained by way of ailments that a student is familiar with. Such information may have been previously recorded in the profile database 110 as a weakness.

Other ways of teaching a topic may include fill-in-the-blank, true or false, quiz, playing a game (e.g., where points are collected for each correct answer with an audio/visual feedback on a user interface of the user device of the student, etc.). In some scenarios, virtual reality (VR) or augmented reality (AR) may be used for effectively teaching a topic. In one embodiment, 3D sound effects within the VR or AR environment is provided to more deeply immerse the student in the topic being taught. The determination of when and/or whether to use VR/AR is discussed later.

In one embodiment, there is a content database 114 that is operative to provide educational content. For example, upon request from the template selector engine 103, the content database 114 provides a content model 115 for the requested topic. A content model may include concept maps, feature vectors, etc., that are related to the requested topic. For example, the content model may include definitions of key terms of the topic, a history of the topic, various examples of the topic, publications on the topic, etc.

In various embodiments, the template selector engine 103 can create its own concept map for a topic based on the content model and the presentation templates, or receive an appropriate concept from a concept map source 116. Concept maps include the meaning of a type of graphic organizer that are used to help organize and represent a body of knowledge related to a topic. Concept maps begin with a main idea (i.e., concept) and then branch out to show how that main idea can be broken down into specific topics (or sub-topics). As used herein a concept map provides one or more paths between a student and the topic being taught. The concept map is discussed in further detail later.

While the template selector engine 103, profile database 110, presentation template database 112, content database 114, and concept map source 116 are illustrated by way of example to be on different platforms, it will be understood that in various embodiments, the template selector engine 103, profile database 110, presentation template database 112, the content database 114, and the concept map source 116 may be combined in various combinations. In other embodiments, these computing platforms may be implemented by virtual computing devices in the form of virtual machines or software containers that are hosted in a cloud, thereby providing an elastic architecture for processing and storage.

Example User Device

Figure 2:
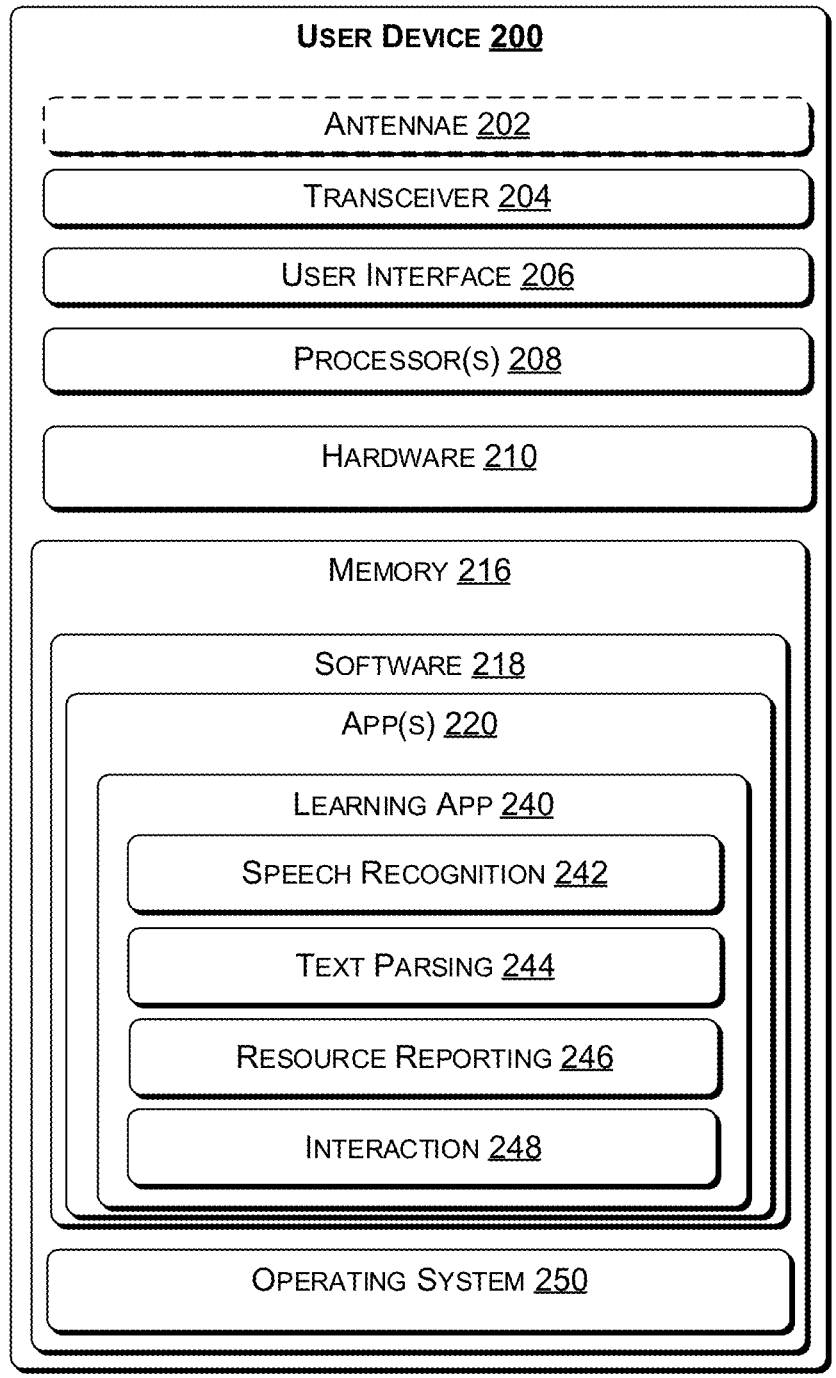
FIG. 2 illustrates a block diagram showing various components of an illustrative user device 200 at a high level.

As discussed in the context of FIG. 1, the interactive learning system in the architecture 100 may involve different types of user devices. To that end, FIG. 2 illustrates a block diagram showing various components of an illustrative user device 200 at a high level. For discussion purposes, the illustration shows the user device 200 in the form of a wireless computing device.

The user device 200 may include one or more antennae 202; a transceiver 204 for cellular, Wi-Fi communication, and/or wired communication; a user interface 206; one or more processors 208; hardware 210; and memory 216. In some embodiments, the antennae 202 may include an uplink antenna that sends radio signals to a base station, and a downlink antenna that receives radio signals from the base station. In some other embodiments, a single antenna may both send and receive radio signals. The same or other antennas may be used for Wi-Fi communication. These signals may be processed by the transceiver 204, sometimes collectively referred to as a network interface, which is configured to receive and transmit digital data. In one embodiment, the user device 200 does not include an antenna 202 and communication with external components is via wired communication.

In one embodiment, the user device 200 includes a user interface 206 that enables a student to provide input and receive output from the user device 200. For example, the user interface 206 may include a data output device (e.g., visual display, audio speakers, haptic device, etc.,) that may be used to display notifications from the template selector engine 103 of the APS 120. More advanced user devices may include a VR or AR capability as part of the hardware 210 of the user device 200, or can be connected to the user device 200 via an interface (e.g., universal serial bus (USB)).

The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces. For example, the data input devices may be used to receive a response to a question posed by the educational template selected by the selector engine 103 during a tutoring session.

The user device 200 may include one or more processors 208, which may be a single-core processor, a multi-core processor, a complex instruction set computing (CISC) processor, or another type of processor.

The hardware 210 may include a power source and digital signal processors (DSPs), which may include single-core or multiple-core processors. The hardware 210 may also include network processors that manage high-speed communication interfaces, including communication interfaces that interact with peripheral components. The network processors and the peripheral components may be linked by switching fabric. The hardware 210 may further include hardware decoders and encoders, a network interface controller, and/or a USB controller.

The memory 216 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various software components or modules that are executable or accessible by the processor(s) 208 and controller(s) of the user device 200. The various components of the memory 216 may include software 218 and an operating system 250. The software 218 may include various applications 220. The software 218 may also include a learning application 240 having several modules. Each module may include routines, program instructions, objects, and/or data structures that perform tasks or implement abstract data types.

For example, the learning application 240 of the user device 200 may include a speech recognition module 242 that enables the recognition (and possible translation) of spoken language into text, such that it can be further processed by the learning application 240 and/or the template selector engine 103.

In one embodiment, the learning application 240 includes a text parsing module 244 operative to provide electronic conversion of images that a student may provide in response to an inquiry, into recognizable printed text and/or images. Accordingly, a student can choose to respond via a drawing or by simply entering information via a finger or stylus to communicate with the learning application 240.

In one embodiment, the learning application 240 includes a resource reporting module 246 operative to report to the template selector engine 103 the hardware and/or software resources, collectively referred to herein as the capabilities of the user device. For example, each UD may have different capabilities. Some UD's may have VR or AR capabilities. Others, may be able to play 3D sound or provide haptic feedback. Based on these hardware and software resources (among other factors), the template selector of the template selector engine 103 can select the appropriate presentation template. In various embodiments, the resource reporting module 246 may report the capabilities of the UD to the template selector engine 103 in the form of a data packet, referred to herein as a resource data packet. Such communication may occur via a push and/or pull communication. For example, the resource reporting module 246 may report the capabilities of the UD during an initial communication to the template selector engine 103. Alternatively, the template selector engine 103 may send a request to the resource reporting module 246 to determine what resources are available on the subject UD.

There is an interaction module 248 operative to receive messages (e.g., questions) from the template selector engine 103 and to communicate the response from the student to the template selector engine 103. In this way, the learning application 240 can work in harmony with the template selector engine 103.

The operating system 250 may include components that enable the user device 200 to receive and transmit data via various interfaces (e.g., user controls, communication interface, and/or memory input/output devices), as well as process data using the processor(s) 208 to generate output. The operating system 250 may include a presentation component that presents the output (e.g., display the data on an electronic display and/or a VR/AR interface of the user device 200, store the data in memory 216, transmit the data to another electronic device, etc.). Additionally, the operating system 250 may include other components that perform various additional functions generally associated with an operating system 250.

Example Concept Map

Figure 3:
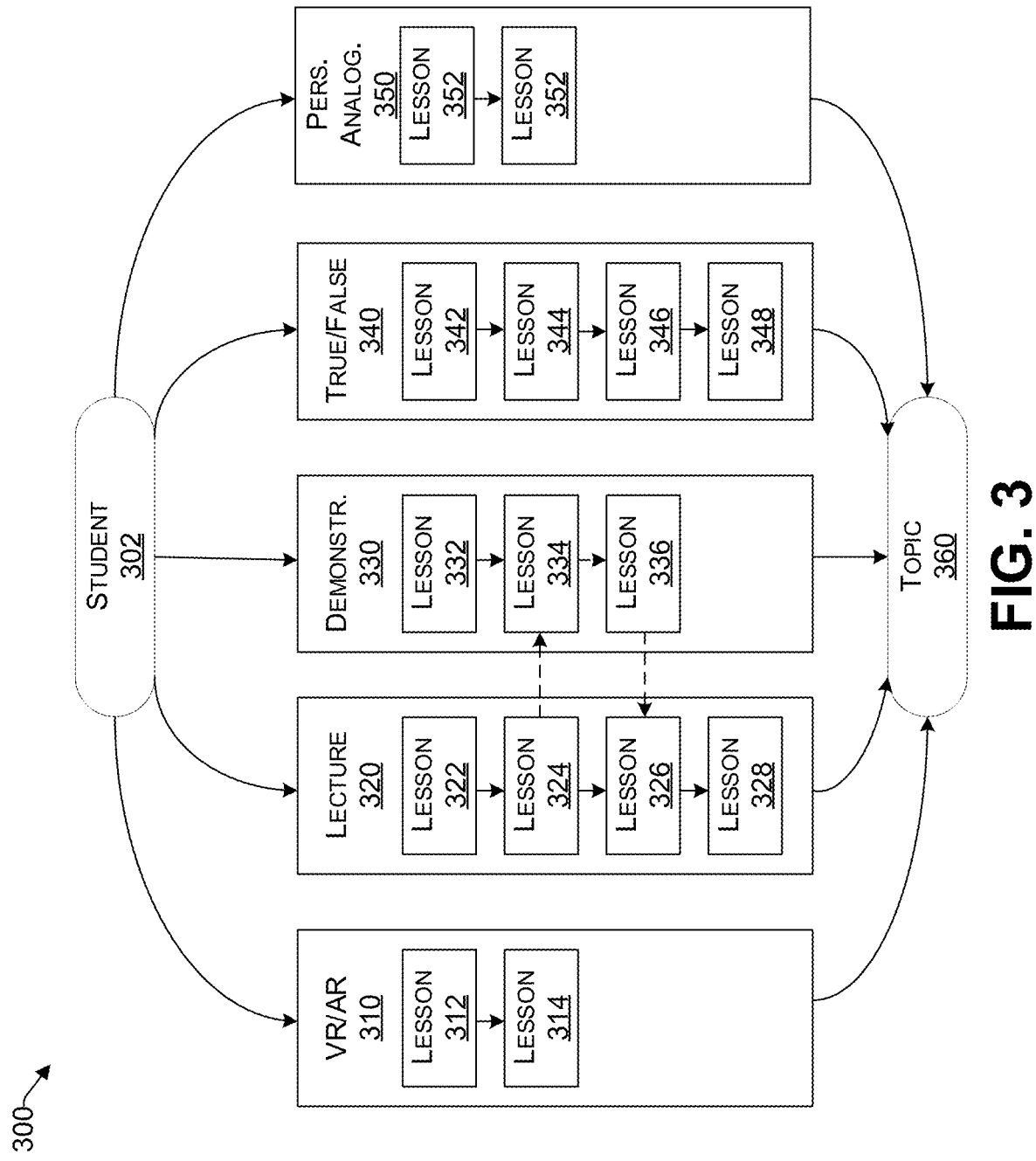
FIG. 3 is an example concept map.

Reference now is made to FIG. 3, which is an example concept map 300. The example concept map 300 includes a user model of a student 302 and a topic 360. In one embodiment, the adaptive presentation server 120 of FIG. 1 uses the template selector engine 103 to create the concept map 300 from the available presentation templates 310, 320, 330, 340 and 350, based on the content model 115 for the topic 360. In another embodiment, the template selector engine receives the concept map 300 from the concept map source 116.

The template selector engine 103 identifies the relevant presentation templates 113 from the presentation templates database 112. In one embodiment, the template selector engine 103 receives the capabilities of the UD to determine what the hardware/software capabilities are of the UD. For example, some UD's may have small screens, while others may have VR or AR capability. These and other factors are later used during the template selection process.

In the example of FIG. 3, the template selector engine 103 determines the appropriate presentation templates from the presentation templates database 112 (and the capabilities of the UD). In the example of FIG. 3, the presentation templates include VR/AR 310, lecture 320, demonstration 330, true/false 340, and personal analogy 350. Put differently, each of these presentation templates can be used to guide the student 302 to achieve a desired level of proficiency with respect to the topic 360. The appropriate path may be chosen based on the user model 111 of the student.

Based on the user model 111 the template selector engine 103 can calculate a cost function for each presentation template path. For example, each presentation template may comprise of one or more lessons that can be taught under that template. Each lesson (e.g., 312) has an associated cost function. In various embodiments, the cost function of each lesson may be provided by the presentation template database 112 or calculated by the template selector engine 103. Accordingly, each presentation template has a default total cost based on the lesson(s) included therein.

Next, a scaling factor, based on the user model, is applied to each presentation template. If no information with respect to the presentation template can be extracted from the user model, then a scaling factor of 1 is applied (which does not change the originally calculated default total cost of the presentation template. However, if a certain template is preferred based on the indicia from the user model, a lower scaling factor is applied (e.g., 0.8). Similarly, if a presentation template is deemed to be not an appropriate mode of teaching the student, then a scaling factor larger than one is applied (e.g., 1.5), thereby discouraging a particular presentation template from being selected by the template selector engine 103 to teach the topic to the student. In this way, the template selector engine 103 can identify the appropriate presentation template for each student individually.

For example, the user model 111 of FIG. 1 may indicate that the student is interested in virtual reality. The capabilities data packet of the UD may also indicate that the UD has VR capability. In this regard, such presentation template will be given preference, and hence, a lower scaling factor is applied (e.g., 0.8) to the path between the student 302 and the topic 360 via the template 310. The cost of the presentation template multiplied by the scaling factor is referred to herein as the cost function of the presentation template. Each template may have one or more lessons. For example, VR/AR 310 may have two lessons that can be displayed via VR/AR, namely 312 and 314.

It should be noted that, in some embodiments, in a single selected curriculum, some lessons may be taught in one template, while others are taught in another template. For example, some lessons may be only available in one template but not in another. In this regard, as illustrated by way of example by the dotted lines between lessons 324, 334, 336 and 326, some curriculums can migrate from one template to another to better accommodate the student. Thus, some educational content may be provided via a first template, while another portion is provided in a second template, etc. In this regard, the scaling factor discussed herein is applied directly to each lesson of the corresponding presentation template. In this way, a hybrid presentation template may be provided to the student to accommodate the identified learning style of the student with respect to the topic 360. In some embodiments, if two or more presentation templates have a same cost function, then the presentation template is chosen randomly from the ones having the same cost function.

Example Process

Figure 4:
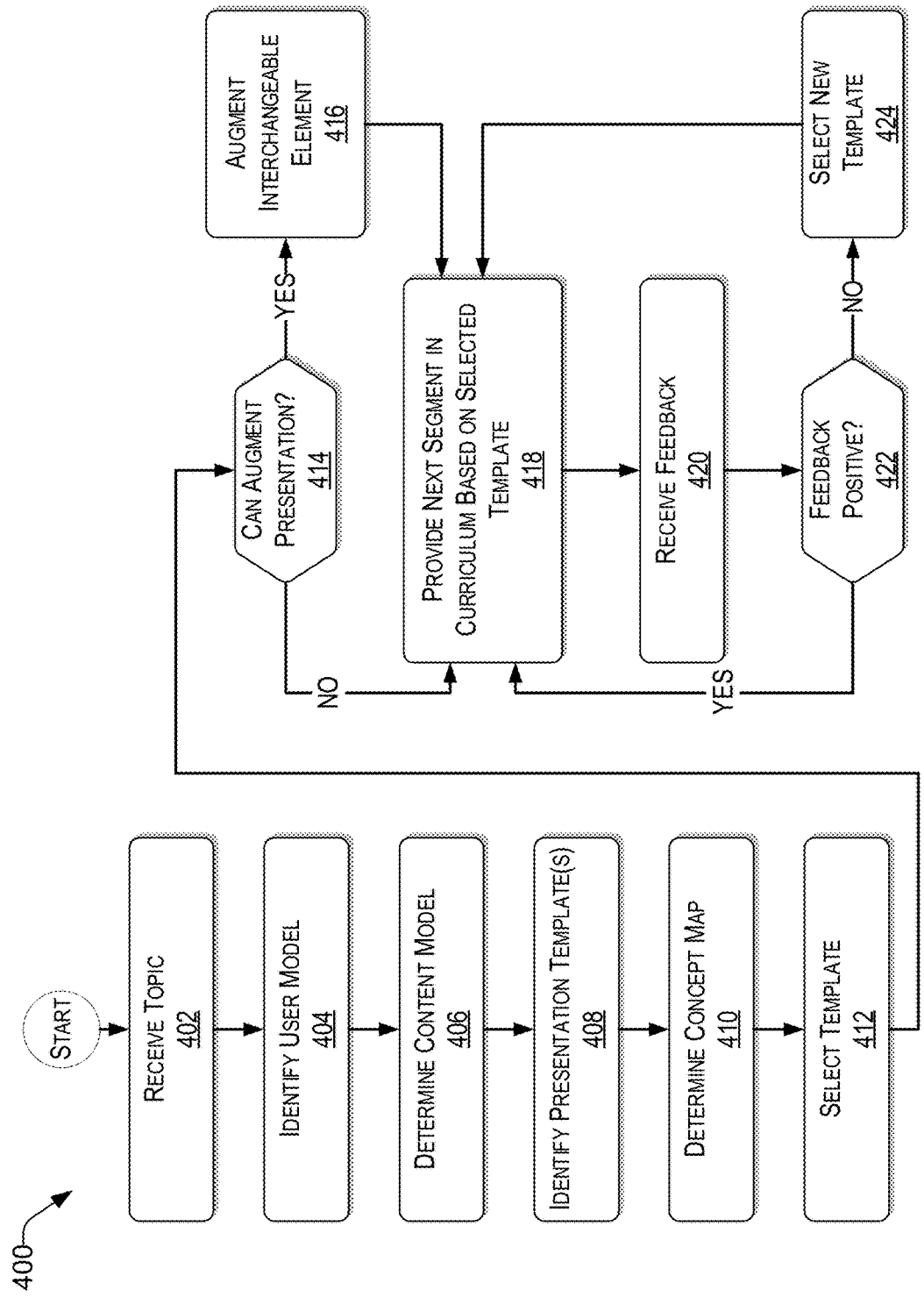
FIG. 4 is an illustrative process for providing an adaptive presentation of educational content via templates.

With the foregoing overview of the architecture 100, example user device 200, and example concept map 300, it may be helpful now to consider a high-level discussion of an example process. To that end, FIG. 4 presents an illustrative process 400 for providing an adaptive presentation of educational content via templates. Processes 400 is illustrated as a collection of blocks in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described blocks can be combined in any order and/or performed in parallel to implement the process. For discussion purposes, the process 400 is described with reference to the architecture 100 of FIG. 1.

At block 402, the template selector engine 103 of the Adaptive Presentation Server 120 receives a topic to be taught to the student. In various embodiments, the topic may be provided in the form of a data packet by the student being taught, the adaptive presentation server 120, by an authorized educator, or from another computerized curriculum source.

At block 404, the template selector engine 103 identifies a user model. For example, the template selector engine 103 interacts with a profile database 110 to receive a user model 111 (e.g., in the form of a data packet) that has various indicia of performance of the student, such as grades, test scores, teacher feedback, class standing, etc. The user model 111 may also include the interests, strengths, and weaknesses of the student.

At block 406, an electronic content model is determined. For example, the template selector engine 103 interacts with the content model database 114 to receive an electronic content model 115 therefrom. The content model 115 may be based on raw data including definitions of key terms of the topic, a history of the topic, various examples of the topic, publications on the topic, etc. Accordingly, the content model provides the metes and bounds of the topic to be taught to the student.

The raw content used by the content database 114 may be structured or unstructured. For example, it may include content from textbooks, databases, videos, web sites, images, etc., that are used by the content database 114 to create a content model 115 therefrom. The extraction of the information from the raw content can later be used to instantiate the presentation templates. The extraction may be performed in various ways, including: statistical classification, case-based reasoning, regular expression (regex), xml schemas, and rule-based reasoning.

In one embodiment, natural language processing (NLP) is used to interpret the raw content to create a content model therefrom. NLP is a field of artificial intelligence, computer science, and computational linguistics that deals with the processing and interpretation of language generated by a human (i.e. the natural element) by a computer. It uses a variety of machine learning techniques to analyze text, process data, and generate insights from large amounts of unstructured data. In various embodiments, the content model 115 may be provided by the content database, where the analysis of the raw content is performed by the content database 114, or may be performed by the template selector engine 103 upon receiving the raw content from the content database 114.

At block 408, the available presentation templates are identified based on the content model. For example, the template selector engine 103 interacts with a presentation template database 112 that includes presentation templates for various topics, to receive a presentation template 113 that relates to the topic to be taught to the student. The received presentation template 113 includes one or more approaches in teaching the topic to the student. Such approaches may include, without limitation, lecture, demonstration, fable, personalized analogy, compare-and-contrast, fill-in-the blank, true or false, quiz, game, etc.

At block 410, a concept map is determined based on the received presentation template(s). For example, for each presentation template, a path is identified between the student and the topic. The adaptive presentation server 120 of FIG. 1 uses the template selector engine 103 to create the concept map 300 from the available presentation templates based on the content model 115 for the topic. In one embodiment, the template selector engine 103 receives the capabilities of the user device of the student to determine what the hardware/software capabilities are of the user device. Alternatively, or in addition, the capabilities of the user device are provided as part of the user model 111 data packet from the profile database 110.

For each presentation template, a cost function is calculated by the template selector engine 103. For example, the total default cost for a presentation template is calculated by summing the cost functions of the lessons therein. An appropriate scaling factor is then applied for each presentation template, respectively. In this way, a cost function of each presentation template is determined. The scaling factor can be identified in various ways. For example, a nearest neighbor classifier, which is a non-parametric approach for classification and regression. In other examples, case-based reasoning, policies derived from reinforcement learning, and/or probabilistic rules may be used.

In one embodiment, concept expansion, such as the IBM Watson concept expansion, is used to determine the scaling factor based on the information provided (i.e., presentation templates 113, the content model 115, and the user model 111). Such concept expansion mimics the human ability to identify concept cues. Large sets of the unstructured sets of data that is provided, functions as the context to learn from. Such concept expansion enables the determination of what learning approaches may better resonate with a student. The more appropriate a presentation template is deemed, the lower the scaling factor.

At block 412, the template selector engine 103 selects a template from the received presentation templates that is deemed to best accommodate the student with respect to the topic. The presentation template that is selected is based on the user model and the available presentation templates for that topic. More particularly, the presentation template with the lowest cost function is selected.

At block 414, the template selector engine 103 determines whether a presentation of the segment of the education content of the selected presentation template can be augmented to better accommodate the student. In one embodiment, augmenting the presentation includes determining which terms, concepts, or features, collectively referred to herein as interchangeable elements, can be replaced with other elements that better accommodate the student, based on the user model. For example, a lesson may use an arbitrary fruit to explain a mathematical concept. Upon determining from the user model that the student is fond of cherries, the lesson may use cherries as a vehicle in explaining the mathematical concept. In another example, upon determining the student is fluent in a foreign language, certain terms in a lecture may be replaced with the foreign language to better engage the student with the curriculum.

Upon determining that the presentation of the content of the selected presentation template can be augmented (i.e., "YES" at decision block 414), the process continues with block 416, where the one or more interchangeable elements are augmented. By virtue of augmenting the interchangeable element, the student is provided with a more comfortable environment, thereby improving their educational experience while learning the topic. The process then continues with block 418, discussed below.

Upon determining that the presentation of the content of the selected presentation template cannot be augmented (i.e., "NO" at decision block 414), the process continues with block 418, where the next segment in the educational content is provided, based on the selected presentation template.

In one embodiment, feedback may be used to progressively finetune the selection of the appropriate presentation template. To that end, at block 420, feedback based on the presently selected presentation template is identified. In various embodiments, the feedback may be based on a quality of the answers provided by the student on their user device (e.g., whether one or more questions are answered correctly) or via direct solicitation of the student. For example, after a predetermined interval (e.g., number of questions or measure of time), the learning application 240 of the user device may provide a questionnaire on a user interface of the user device to solicit feedback from the student. For example, the student may be asked whether they are finding the presentation template effective. The student may provide a score that, in various embodiments, may be alpha-numeric (e.g., 0 to 10, A to F), descriptive (e.g., Excellent, Good, Average, Poor), based on color (e.g., red, green, and yellow), binary (e.g., Good/Bad), or any other suitable rating scale.

Upon receiving this feedback, at block 422, the template selector engine 103 determines whether the feedback is positive. If so (i.e., "YES" at decision block 422), the curriculum continues with the same presentation template. If not (i.e., "NO" at decision block 422), at block 424 a different presentation template is selected and the process continues with block 418. In one embodiment, the different presentation template is a presentation template that has the second lowest cost factor.

Example Computer Platform

Figure 5:
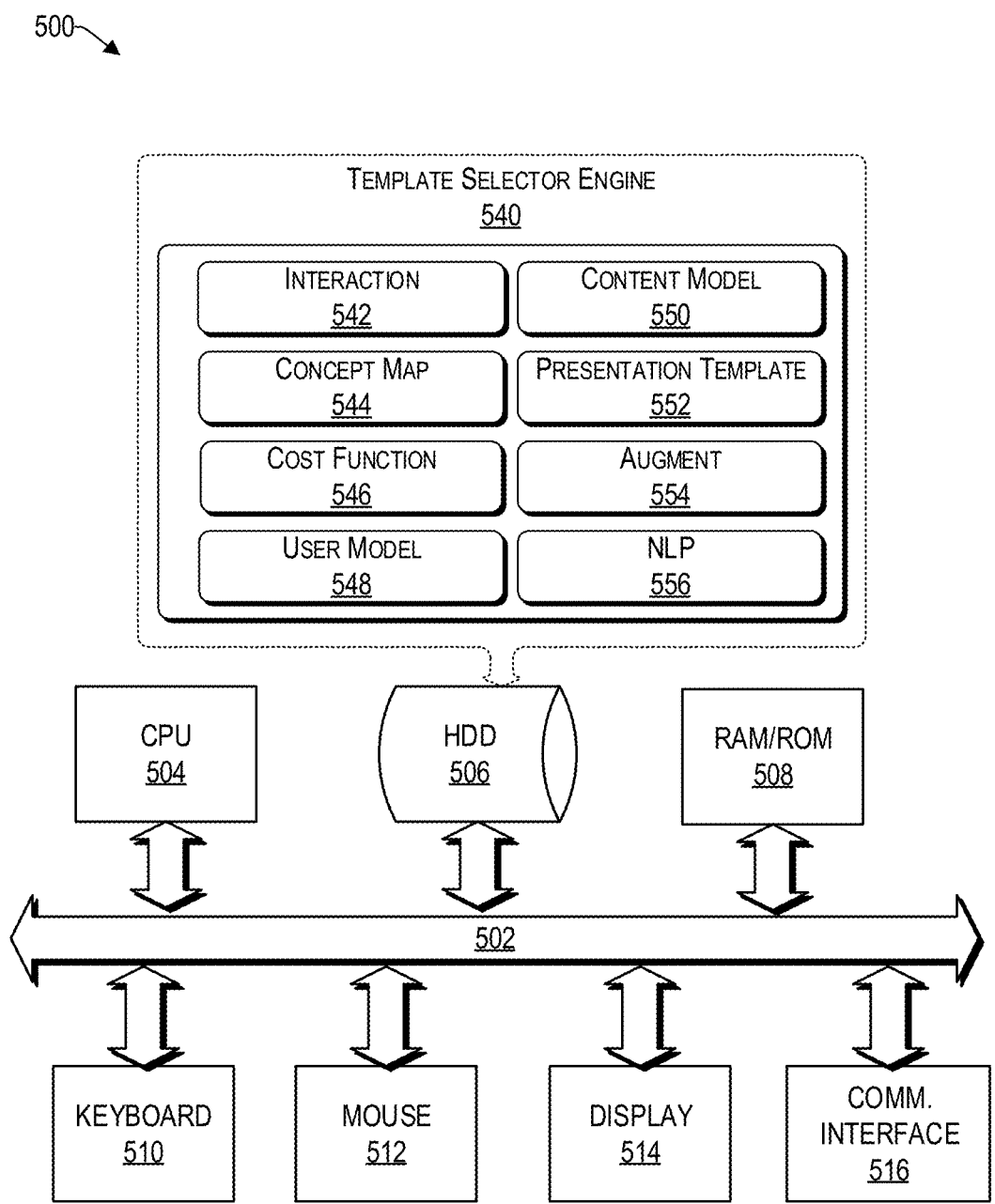
FIG. 5 provides a functional block diagram illustration of a computer hardware platform.

As discussed above, functions relating to providing an interactive and intelligent tutoring system that automatically selects an educational presentation template for teaching a student, can be performed with the use of one or more computing devices connected for data communication via wireless or wired communication, as shown in FIG. 1 and in accordance with the process 400 of FIG. 4. An exemplary computing device in the form of a user device 200 has been discussed above with respect to FIG. 2. FIG. 5 provides a functional block diagram illustration of a computer hardware platform. In particular, FIG. 5 illustrates a network or host computer platform 500, as may typically be used to implement a server, such as the APS 120, the profile database 110, the presentation template database 112, the content database 114, and the concept map source 116 of FIG. 1.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506, has capabilities that include storing a program that can execute various processes, such as the template selector engine 540, in a manner described herein. The template selector engine 540 may have various modules configured to perform different functions.

For example, there may be an interaction module 542 that is operative to provide questions to the student and receive responses therefrom. In addition, the interaction module 542 may receive information regarding the hardware and software resources of a user device.

There may be a concept map module 544 operative to create a concept map based on the content model and the presentation templates with respect to a teaching topic. In one embodiment, instead of creating the concept map is not created by the template selector engine; rather, it is retrieved from a concept map source 116.

There is a cost function module 546 operative to determine the cost of each presentation template. There is a user model module 548 operative to extract a user model 111 from a user profile database 110. There is a content model module 550 operative to receive a content model 115 from the content model database 114. There is a presentation template module 552 operative to receive and process the various presentation templates 113 from a presentation template database 112. The presentation template module 552 also determines the appropriate presentation template to use for a student based on the student's user model and the content model.

There is an augment module 554 operative to determine which elements are interchangeable in a presentation template. The augment module 554 can then augment one or more of these interchangeable elements to better accommodate a student based on their user model.

In one embodiment, there is a natural language processing module 556 that is operative to interpret various indicia provided of the user model. The module 556 helps the presentation template module 552 to determine the appropriate presentation template to select.

In one embodiment, a program, such as Apache™, can be stored for operating the system as a Web server. In one embodiment, the HDD 506 can store an executing application that includes one or more library software modules, such as those for the Java™ Runtime Environment program for realizing a JVM (Java™ virtual machine).

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing device comprising:
    a processor;
    a network interface coupled to the processor to enable communication over a network;
    a storage device coupled to the processor;
    a template selector software stored in the storage device, wherein an execution of the software by the processor configures the computing device to perform acts comprising:
        receiving, over the network, a data packet having a topic to be taught to a student;
        storing the topic in the storage device;
        identifying a user model of the student;
        determining an electronic content model for the stored topic;
        identifying one or more presentation templates based on the electronic content model;
        determining a concept map based on the one or more presentation templates;
        applying a scaling factor to each corresponding presentation template to determine a cost function for each presentation template;
        selecting a presentation template from the one or more presentation templates with a lowest cost function; and
        providing a segment of an educational content of the topic to a user device of the student, over the network, based on the selected presentation template.

2. The computing device of claim 1, wherein identifying a user model of the student comprises receiving from a user model database a data packet having at least one of: (i) an indicia of performance, (ii) a strength, (iii) a weakness, and (iv) an interest of the student.

3. The computing device of claim 1, wherein execution of the template selector software by the processor further configures the computing device to perform an act comprising receiving a resource data packet from the user device, wherein:
    the resource data packet includes at least one of: (i) hardware resources and (ii) software resources of the user device; and
    the resource data packet is used as a factor in selecting the presentation template from the one or more presentation templates.

4. The computing device of claim 3, wherein the resource data packet is received in response to a request from the template selector software that is sent to the user device over the network.

5. The computing device of claim 1, wherein each of the one or more presentation templates provides a different approach in teaching the segment of the educational content to the student.

6. The computing device of claim 1, wherein determining a concept map comprises, for each presentation template, creating a path between the student and the topic, each path comprising one or more lessons based on the corresponding presentation template.

7. The computing device of claim 1, wherein:
identifying the one or more presentation templates comprises receiving a resource data packet from the user device of the student;
the resource data packet includes at least one of (i) hardware and (ii) software capabilities of the user device; and
the identification of the one or more presentation templates is also based on the resource data packet.

8. The computing device of claim 1, wherein execution of the template selector software by the processor further configures the computing device to perform acts comprising:
upon determining that a presentation of the segment of the educational content of the selected presentation template can be augmented, augmenting an interchangeable element of the segment of the educational content based on the user model of the student.

9. The computing device of claim 1, wherein execution of the template selector software by the processor further configures the computing device to perform acts comprising:
receiving feedback from the user device regarding an effectiveness of the selected presentation template;
upon determining, based on the received feedback, that the selected presentation template is effective, using the selected presentation template on a next segment of the educational content; and
upon determining, based on the received feedback, that the selected presentation template is not effective, selecting a presentation template that has a second lowest cost function for the next segment of the educational content.

10. A non-transitory computer readable storage medium tangibly embodying a computer readable program code having computer readable instructions that, when executed, causes a computer device to carry out a method of providing educational content to a student, the method comprising:
receiving, over a network, a data packet having a topic to be taught to a student;
storing the topic in the storage device;
identifying a user model of the student;
determining an electronic content model for the topic;
identifying one or more presentation templates based on the electronic content model;
determining a default cost of each presentation template;
determining a scaling factor for each presentation template based on the user model;
determining a concept map based on the one or more presentation templates;
selecting a presentation template from the one or more presentation templates; and
providing a segment of an educational content of the topic to a user device of the student, over the network, based on the selected presentation template.

11. The non-transitory computer readable storage medium of claim 10, wherein identifying a user model of the student comprises receiving from a user model database a data packet having at least one of: (i) an indicia of performance, (ii) a strength, (iii) a weakness, and (iv) an interest of the student.

12. The non-transitory computer readable storage medium of claim 10, further comprising receiving a resource data packet from the user device, wherein:
the resource data packet includes at least one of: (i) hardware resources and (ii) software resources of the user device; and
the resource data packet is used as a factor in selecting the presentation template from the one or more presentation templates.

13. The non-transitory computer readable storage medium of claim 12, wherein the resource data packet is received in response to a request that is sent to the user device over the network.

14. The non-transitory computer readable storage medium of claim 10, wherein each of the one or more presentation templates provides a different approach in teaching the segment of the educational content to the student.

15. The non-transitory computer readable storage medium of claim 10, wherein determining a concept map comprises, for each presentation template, creating a path between the student and the topic, each path comprising one or more lessons based on the corresponding presentation template.

16. The non-transitory computer readable storage medium of claim 10, wherein:
identifying the one or more presentation templates comprises receiving a resource data packet from the user device of the student;
the resource data packet includes at least one of (i) hardware and (ii) software capabilities of the user device; and
the identification of the one or more presentation templates is also based on the resource data packet.

17. The non-transitory computer readable storage medium of claim 10, further comprising, upon determining that a presentation of the segment of the educational content of the selected presentation template can be augmented, augmenting an interchangeable element of the segment of the educational content based on the user model of the student.

18. The non-transitory computer readable storage medium of claim 10, further comprising:
receiving feedback from the user device regarding an effectiveness of the selected presentation template;
upon determining, based on the received feedback, that the selected presentation template is effective, using the selected presentation template on a next segment of the educational content; and
upon determining, based on the received feedback, that the selected presentation template is not effective, selecting a presentation template that has a second lowest cost function for the next segment of the educational content.

* * * * *